(12) United States Patent
Vermeulen

(10) Patent No.: US 6,699,440 B1
(45) Date of Patent: Mar. 2, 2004

(54) DEVICE FOR PURIFYING A MERCURY-CONTAINING FLUE GAS

(76) Inventor: Anthonius Hendricus Maria Vermeulen, Van Eesterenstraat 16, 7425 EJ, Deventer (NL)

( * ) Notice: Subject to any disclaimer, the term of this patent is extended or adjusted under 35 U.S.C. 154(b) by 0 days.

(21) Appl. No.: 09/554,760
(22) PCT Filed: Nov. 19, 1998
(86) PCT No.: PCT/NL98/00654
§ 371 (c)(1),
(2), (4) Date: May 9, 2000
(87) PCT Pub. No.: WO99/25462
PCT Pub. Date: May 27, 1999

(30) Foreign Application Priority Data

Nov. 19, 1997 (NL) .............................. 1007579

(51) Int. Cl.[7] .............................................. B01D 53/64
(52) U.S. Cl. ...................... 422/177; 422/170; 422/171; 422/181
(58) Field of Search ................................. 422/168–171, 422/177–178, 181; 423/210

(56) References Cited

U.S. PATENT DOCUMENTS

| | | | | |
|---|---|---|---|---|
| 4,094,777 A | * | 6/1978 | Sugier et al. ................ | 210/670 |
| 5,245,106 A | * | 9/1993 | Cameron et al. ......... | 423/215.5 |
| 5,409,522 A | * | 4/1995 | Durham et al. ............. | 423/210 |
| 5,587,136 A | * | 12/1996 | Ikeyama et al. .......... | 423/239.1 |

FOREIGN PATENT DOCUMENTS

WO  WO 92/16284  * 10/1992

* cited by examiner

*Primary Examiner*—Hien Tran
(74) *Attorney, Agent, or Firm*—Michael D. Bednarek; Shaw Pittman LLP

(57) ABSTRACT

Device for purifying a mercury-containing flue gas, at least comprising dust removing means for removing dust from a flue gas, and a quantity of a regenerable amalgamable material for removing mercury from a flue gas, which device is adapted for removal therefrom in amalgamated state of the quantity of amalgamable material for the purpose of regenerating this material, wherein the material is provided in a manner such that it can be regenerated in amalgamated state outside the device.

7 Claims, 1 Drawing Sheet

DEVICE FOR PURIFYING A MERCURY-CONTAINING FLUE GAS

BACKGROUND

Field of the Invention

The invention relates to a device for purifying a mercury-containing flue gas, at least comprising dust removing means for removing dust from a flue gas, and a quantity of a regenerable amalgamable material for removing mercury from a flue gas.

From the international patent publication WO 92/16284 is known a filter for removing mercury (Hg) from flue gas, which filter comprises a housing with an inlet opening and an outlet opening for gases for purifying and a filter body. The filter body consists of a large number of layers of a thin metal foil covered with a gold layer, between which layers channels are formed for guiding gases for purifying along these layers. In the known filter electrical heating wires or other means are provided for heating said metal foil and the gold layer deposited thereon to a temperature above 20° C. in order to regenerate the filter in situ. During regeneration of the filter air or another gas is preferably guided through said channels.

The known filter is particularly intended for use in combination with a cremation furnace to remove mercury originating from dental fillings. Due to the heating installation required for regenerating the gold foil and the cooling device inherently associated therewith which enables condensation of the mercury coming from the filter and released during regeneration, the filter is expensive to purchase and its complexity makes operation vulnerable. Replacement of the filter body requires disassembly of the electrical heating cables and the filter housing, which may necessitate a prolonged and usually unexpected and therefore undesirable interruption in operations.

SUMMARY OF THE INVENTION

The object of the invention is to provide an operationally reliable purifying device for removing mercury from flue gas, which is particularly suitable for use in combination with a cremation furnace, which can be manufactured and operated at relatively low cost and which can be regenerated in simple manner without expensive provisions being required for this purpose or normal operations having to be discontinued for a protracted period.

These objectives are achieved, and other advantages obtained, with a purifying device of the type stated in the preamble, which device is adapted according to the invention for removal therefrom in amalgamated state of the quantity of amalgamable material for the purpose of regenerating this material, wherein the material is provided in a manner such that it can be regenerated in amalgamated state outside the device.

Amalgamable material is here understood to mean any material which is capable of alloying with mercury or of binding with mercury by adsorption; amalgamated state is understood to mean a state in which the material is alloyed with mercury or has bound with mercury by adsorption.

In an embodiment of a purifying device according to the invention the quantity of amalgamable material is a quantity of amalgamable metal which is accommodated in removable manner in a filter housing which is adapted to guide a mercury-containing flue gas through this filter housing and in contact with this metal.

The amalgamable metal is for instance metal selected from the group comprising copper (Cu), silver (Ag) and gold (Au).

In an advantageous embodiment the amalgamable metal is copper (Cu) with sulphur (S) bound thereto, this being obtained for instance from a reaction of copper (Cu) with solid sulphur (S) at a temperature of about 104° C. By binding S to Cu the surface of Cu available for amalgamation is enlarged, while the capacity for binding mercury is further increased by the S, which forms the compound mercury sulphide (HgS) with mercury.

It has been found that mercury-containing copper with sulphur bound thereto can be regenerated in simple manner in a vacuum oven at a temperature of about 550° C., wherein formed HgS decomposes into Hg and S, and Hg which has been taken up into Cu with the formation of a CuHg alloy is released.

In a subsequent embodiment of a purifying device according to the invention the quantity of amalgamable material is a quantity of inorganic amalgamable material which is accommodated in removable manner in a filter housing which is adapted to guide a mercury-containing flue gas through this filter housing and in contact with this material.

The quantity of inorganic amalgamable material is poured for instance in powder or granule form into a container with a gas-permeable bottom which fits into a filter housing such that flue gas guided through this housing is guided via the bottom of the container through the quantity of amalgamable material, wherein mercury in the flue gas is bound by this material.

In an advantageous embodiment of a purifying device according to the invention the inorganic amalgamable material is a mixture of titanium dioxide ($TiO_2$) and divanadium pentoxide ($V_2O_5$), wherein the quantity of $V_2O_5$ in the mixture lies for instance in the region of 4–7% by weight, the $TiO_2$ forms a carrier for the $V_2O_5$ and/or the carrier of $TiO_2$ and the $V_2O_5$ carried thereby is provided by particles with a nominal diameter of about 0.8 mm.

In a device according to the invention the quantity of amalgamable material is accommodated for instance in a laminar flow reactor (LFR) for removing mercury from a mercury-containing flue gas guided in a laminar flow through this reactor in contact with this material.

In a particularly advantageous embodiment the quantity of amalgamable material in a device according to the invention is accommodated in a radial flow reactor (RFR) for removing mercury from a mercury-containing flue gas guided in a radial flow through this reactor in contact with this material.

In a radial flow reactor in a device according to the invention the quantity of amalgamable material is provided in a cylindrical reactor vessel between two internal cylindrical walls, and a flue gas is guided in radial direction from the outer wall through the quantity of amalgamable material to the axis of the cylindrical reactor vessel, wherein a pressure gradient is created over the quantity of amalgamable material which enhances the amalgamation process.

In a very advantageous embodiment of a device according to the invention the dust removing means comprise a cyclone or an electro-filter placed in a conduit system for a mercury-containing flue gas flow upstream in the device relative to the quantity of amalgamable material.

Use of a cyclone, which in this respect should also be understood to mean a multi-cyclone and a rotating particle separator, or an electro-filter makes it possible to filter out dust particles from a flue gas at a relatively short distance from the relevant furnace at a temperature which is so high that the flue gas is not saturated with mercury, and all the mercury present in the gas is therefore carried along further downstream in said conduit system to the amalgamable material present in the device.

The invention will be elucidated hereinbelow on the basis of an embodiment and with reference to the drawing.

DETAILED DESCRIPTION OF THE PREFERRED EMBODIMENT

Figure 1:
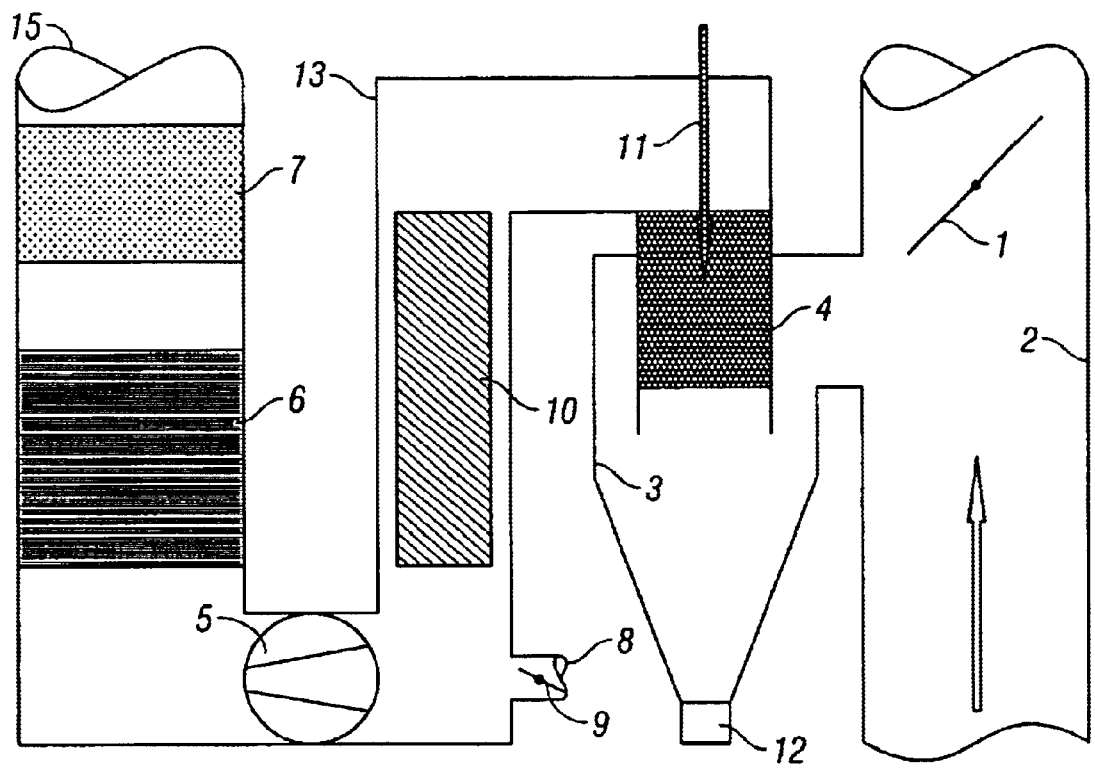
FIG. 1 shows a diagram of an embodiment of a purifying device according to the invention in a configuration in which the device is used for selective purifying of flue gas from a cremation furnace.

FIG. 1 shows schematically a flue gas purifying device which is connected to the chimney 2 of a cremation furnace (not shown) which is closable with a control valve 1. The flue gas purifying device is composed successively of a cyclone 3, a fine dust filter 4, the outlet opening 15 of which is in contact with an amalgam filter 6 and an activated carbon filter 7 via a conduit 13 in which a beat exchanger 10 and a fan 5 are accommodated. The figure further shows a collecting tube/dust tube 12 under cyclone 3 for collecting dust, and an inlet opening 8 for cooling air closable by a control valve 9. The operation of the purifying device is as follows. It is known that during a cremation mercury from dental fillings is released about 10 to 50 minutes after the beginning of the cremation process for a period lasting about 30 minutes. The release of mercury is detected in the device using a suitable mercury sensor (not shown), whereupon control valve 1 is closed using a per se known circuit and the flue gas is guided via chimney 2 through cyclone 3, where hot flue gas purified of coarse dust particles is guided by; means of fan 5 via a fine dust filter 4 through a conduit 13 along a heat exchanger 10 to the amalgam filter 6. The temperature of the flue gas in amalgam filter 6 is brought to about 150° C. using heat exchanger 10 and optionally by drawing in cold ambient air via inlet opening 8. With an amalgam filter 6 in which the amalgamable material is for instance copper, silver or gold, about 90% of the quantity of mercury present in the flue gas is bound. The remaining amount of mercury is absorbed in the activated carbon filter 7, which is impregnated with for instance sulfur (S) or potassium iodide (KI). In addition to the mercury remnant, dioxins and furans present in the flue gas are also bound in activated carbon filter 7. Fine dust filter 4 is periodically cleaned when the device is not in use by blowing compressed air therethrough in counter flow as according to the direction of arrow 11, wherein dust which has been blown loses is collected in dust tube 12 of cyclone 3. The filter body of amalgam filter 6 is periodically replaced in fast and simple manner by a new or regenerated filter body. For this purpose the amalgam filter 6 has a modular assembly. A filter body with bound mercury is heated in an oven at a temperature of about 850° C., wherein mercury is released which is carried along by a gas flow and collected in a cooler where it condenses at a temperature of about −30° C. The amount off mercury captured in a filter amounts at a rough estimate to about 740 grams after 250 cremations which in normal circumstances are carried out in a crematorium in a period of six months.

As an alternative to an amalgam filter 6 with copper, silver or gold, a laminar flow reactor (LFR) of a modular type can be used, wherein an easily exchangeable filter body is filled with particles of a porous structure and a nominal diameter of about 0.8 mm, composed of titanium dioxide ($TiO_2$) and 4–7% by weight of divanadium pentoxide ($V_2O_5$), wherein the $TiO_2$ forms a carrier for the $V_2O_5$ present in a quantity of 4–7% by weight. Such a material is commercially available from CRI Catalyst Company U.K. Ltd., and is supplied under the name "Catalyst S096" as catalyst for reducing nitrogen oxides ($NO_x$). Use of this material in a device according to the invention offers the advantage that nitrogen oxides are also removed from a flue gas, which is a legal requirement in some countries for flue gas purifying installations for cremation furnaces.

It is noted that the purifying device according to the invention is particularly suitable for use in combination with a cremation furnace, but that use of the device is not limited thereto.

The following experiments demonstrate the action of said composition $V_2O_5/TiO_2$ ("Catalyst S096") as mercury-assimilating material.

EXAMPLE 1

In a through-flow tube with a diameter of 1 cm mercury vapour-containing air with an Hg concentration of more than 2000 $\mu g/m^3$ was guided at a temperature of 22° C., an air pressure of 1013 mBar and a relative humidity of 50% for 0.5 hour through a sample of 5 g $V_2O_5/TiO_2$ "Catalyst S096" and subsequently via a plastic Tygon hose with dust filter to a UV mercury vapour meter, The measured Hg concentration after guiding of the air through the sample of $V_2O_5/TiO_2$ amounted to 25 $\mu g/m^3$, which corresponds to a mercury reduction of more than 98.75%.

EXAMPLE 2

The experiment described under example 1 was repeated at a temperature of 100° C. under otherwise identical conditions. The measured Hg concentration after guiding of the air through the sample of $V_2O_5/TiO_2$ amounted to 250 $\mu g/m^3$, which corresponds to a mercury reduction of more than 87.50%.

EXAMPLE 3

The experiment described under example 1 was repeated under wholly identical conditions. The measured Hg concentration after guiding of the air through the sample of $V_2O_5/TiO_2$ amounted to 5 $\mu g/m^3$, which corresponds to a mercury reduction of more than 99.75%.

EXAMPLE 4

The experiment described under example 1 was repeated wherein the mercury vapour-containing air was guided through the sample for 10 hours under otherwise identical conditions. The measured Hg concentration after guiding of the air through the sample of $V_2/Ti_2$ amounted to 1 $\mu g/m^3$, which corresponds to a mercury reduction of more than 99.95%.

COMPARATIVE EXAMPLE 1

The experiment described under example 1 was repeated wherein the sample of $V_2O_5/TiO_2$ was replaced by a rod-like sample of 6 g active carbon with a length of 3 mm under otherwise identical conditions. The measured Hg concentration after guiding of the air through the sample amounted to 5 $g/m^3$, which corresponds to a mercury reduction of more than 99.75%.

COMPARATIVE EXAMPLE 2

The experiment described under example 1 was repeated wherein the sample of $V_2O_5/TiO_2$ was replaced by a 3 mm-long rod-like sample of 6 g of active carbon which was impregnated with 5% potassium iodide (KI) under otherwise identical conditions. The Hg concentration after guiding of the air through the sample was not measurable, which corresponds with a mercury reduction of about 100%.

COMPARATIVE EXAMPLE 3

The experiment described under comparative example 2 was repeated wherein the mercury vapour-containing air was guided over the sample for 200 hours under otherwise identical conditions. The Hg concentration after guiding of the air through the sample was not measurable, which corresponds with a mercury reduction of about 100%.

COMPARATIVE EXAMPLE 4

The experiment described under example 1 was repeated wherein the sample of $V_2O_5/TiO_2$ was replaced by a sample of 7 g silver wool with a wire thickness of 0.05 mm under otherwise identical conditions. The measured Hg concentration after guiding of the air through the sample amounted to 1 $\mu g/m^3$, which corresponds to a mercury reduction of more than 99.95%.

COMPARATIVE EXAMPLE 5

The experiment described under comparative example 4 was repeated wherein the mercury vapour-containing air was guided through the sample for 10 hours under otherwise identical conditions. The measured Hg concentration after guiding of the air through the sample amounted to 700 $\mu g/m^3$, which corresponds to a mercury reduction of more than 62.50%.

The results of the above described experiments are collected in table 1.

TABLE 1

Results mercury reduction from mercury vapour-containing air

| | Sample | Quantity of sample (g) | Duration of contact sample Hg vapour (hours) | Conc. of Hg before contact sample ($\mu g/m^3$) | Conc. of Hg after contact sample ($\mu g/m^3$) | Hg reduction (%) |
|---|---|---|---|---|---|---|
| Example | | | | | | |
| 1 | $V_2O_5/TiO_2$ "Catalyst S096" | 5 | 0.5 | >2000 | 25 | >98.75 |
| 2 | $V_2O_5/TiO_2$ "Catalyst S096" | 5 | 0.5* | >2000 | 250 | >87.50 |
| 3 | $V_2O_5/TiO_2$ "Catalyst S096" | 5 | 0.5 | >2000 | 5 | >99.75 |
| 4 | $V_2O_5/TiO_2$ "Catalyst S096" | 5 | 10 | >2000 | 1 | >99.95 |
| Comparative example | | | | | | |
| 1 | Active carbon | 6 | 0.5 | >2000 | 5 | >99.75 |
| 2 | Active carbon with 5% KI | 6 | 0.5 | >2000 | 0 | 100 |
| 3 | Active carbon with 5% KI | 6 | 200 | >2000 | 0 | 100 |
| 4 | Silver wool | 7 | 0.5 | >2000 | 1 | >99.95 |
| 5 | Silver wool | 7 | 10 | >2000 | 700 | >62.50 |

*at a temperature of 100° C.

What is claimed is:

1. A device for purifying a mercury-containing flue gas, comprising:
   dust removing means (3, 4, 12) for removing dust from the flue gas, and
   a quantity of a regenerable amalgamable material in a filter housing (6) that is configured to guide the mercury-containing flue gas through this filter housing (6) and in contact with this material for removing mercury from the flue gas, characterized in that the quantity of amalgamable material is provided in a manner such that in amalgamated state it is removable from the filter housing (6) for the purpose of regenerating this material outside the device, the amalgamable material being a composition of titanium dioxide ($TiO_2$) and divanadium pentoxide ($V_2O_5$).

2. The device as claimed in claim 1, characterized in that the quantity of $V_2O_5$ in the composition lies in the region of 4–7% by weight.

3. The device as claimed in claim 1, characterized in that the $TiO_2$ forms a carrier for the $V_2O_5$.

4. The device as claimed in claim 3, characterized in that the carrier of $TiO_2$ and the $V_2O_5$ carried thereby is provided by particles with a nominal diameter of about 0.8 mm.

5. The device as claimed in claim 1, characterized in that the quantity of amalgamable material is accommodated in a laminar flow reactor (LFR) within the filter housing for removing mercury from the mercury-containing flue gas which is guided in a laminar flow through this reactor in contact with this material.

6. The device as claimed in claim 1, characterized in that the quantity of amalagamable material is accommodated in a radial flow reactor (RFR) within the filter housing for removing mercury from the mercury-containing flue gas guided in a radial flow through this reactor in contact with this material.

7. The device as claimed in any of the foregoing claims, characterized in that the dust removing means comprise a cyclone (3) or an electro-filter placed in a conduit system for the mercury-containing flue gas flow upstream in the device relative to the quantity of amalgamable material.

* * * * *

UNITED STATES PATENT AND TRADEMARK OFFICE
CERTIFICATE OF CORRECTION

PATENT NO. : 6,699,440 B1
DATED : March 2, 2004
INVENTOR(S) : Anthonius Hendricus Maria Vermeulen It is certified that error appears in the above-identified patent and that said Letters Patent is hereby corrected as shown below:

Title page,
Item [22], PCT Filed: should read -- November 12, 1998 --.

Signed and Sealed this

Twenty-first Day of September, 2004

JON W. DUDAS
*Director of the United States Patent and Trademark Office*